UNITED STATES PATENT OFFICE.

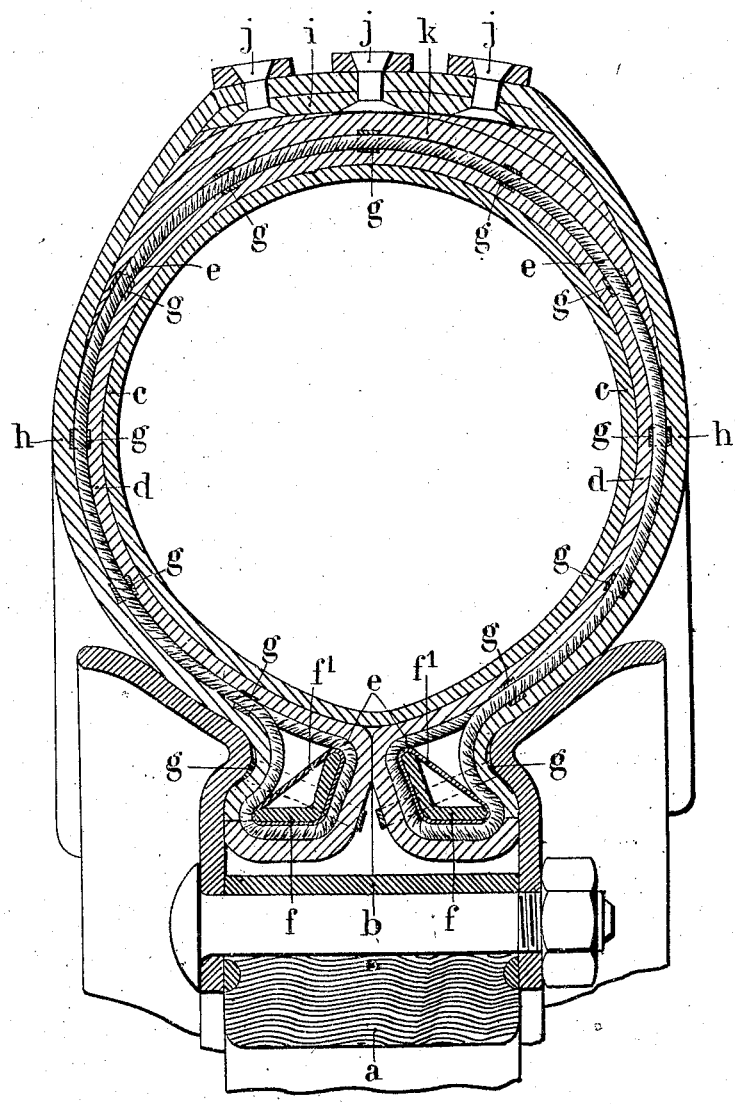

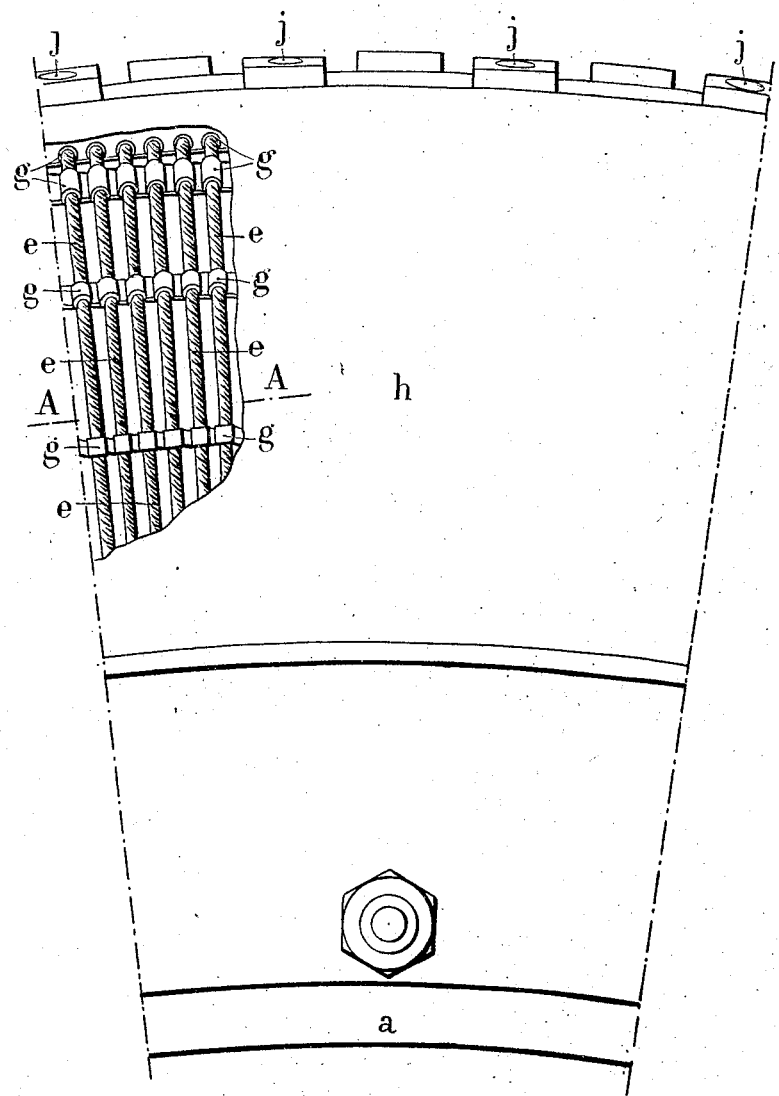

PAUL ISIDORE VIEL, OF PARIS, FRANCE.

PNEUMATIC TIRE.

No. 929,351.  Specification of Letters Patent.  Patented July 27, 1909.

Application filed February 29, 1908. Serial No. 418,411.

*To all whom it may concern:*

Be it known that I, PAUL ISIDORE VIEL, of 37 Rue de Rivoli, in the city of Paris, Republic of France, gentleman, have invented Improvements in Pneumatic Tires, of which the following is a full, clear, and exact description.

This invention relates to a pneumatic tire characterized by the use of a lining formed of a metal cable or wire arranged as hereinafter described. This packing or lining is intended to entirely do away with ruptures resulting from excessive pressure, or excessive weight, or overheating and punctures. This lining diminishes in no way the flexibility of the tire.

This invention will be hereinafter described with reference to the accompanying drawings in which:

Figure 1 shows the tire in cross-section. Fig. 2 shows the same tire in front view, a portion of same being removed to show the said lining. Fig. 3 is a part sectional plan view made according to line A—A of Fig. 2.

As shown in this drawing, above the wood rim $a$ and the iron ring $b$, there is the ordinary air chamber $c$. This air chamber is first covered by a leather casing $d$ and then by the lining $e$ constituted by coils arranged adjacent to one another and formed by means of one or several metal cables or wires wound around two metallic rings $f$ having the form of angle-irons arranged on the sides of the tire and acting as beads. Each of the coils of the cable is arranged next to the preceding one so as to be continued over the whole periphery of the packing. A casing $f'$ of leather separates the cable from the metallic rings. The coils formed by the winding of the cable are spaced at an equal distance the one from the other, this spacing being maintained by means of a certain number of bindings consisting of leather straps $g$ wound above each coil, as shown more particularly in Fig. 3 of the drawing, in order to connect them together in the circumferential direction of the wheel. The leather straps can be replaced by gut strings or any flexible bindings. This lining thus constitutes a kind of web the cables $e$ of which can be arranged radially from the center to the circumference, as shown in the drawing.

Over the lining there is placed a chrome leather casing $h$ reinforced at its upper part by means of a leather band $i$. The casing and the band are connected by means of non-skidding rivets $j$. Finally, other leather bands $k$ separate the lining from the rivets and give, in virtue of their shape, a flat tread.

Claims:

1. A pneumatic tire comprising an inner tube, a pair of rings adapted to encircle the rim, a metallic cable engaging the rings alternately, the slack of the cable encircling the inner tube, means for securing the coils of the cable together, and a covering on both sides of said coils, and encircling the rings.

2. A pneumatic tire comprising an inner tube, a pair of rings adapted to encircle the rim, and a plurality of flexible metallic coils encircling the tube, and arranged in parallelism with each other, the end of the coils engaging the rings, a covering for both faces of the coils, and means for securing the coils in spaced relation.

3. A pneumatic tire comprising a pair of rings adapted to encircle the rim, a metallic cable engaging the rings alternately, the slack of the cable encircling the inner tube and a covering for the cable.

The foregoing specification of my improvements in pneumatic tires signed by me this seventeenth day of February 1908.

PAUL ISIDORE VIEL.

Witnesses:
HANSON C. COXE,
MAURICE H. PIGNET.